United States Patent [19]

Maurer

[11] 4,003,089
[45] Jan. 11, 1977

[54] ELECTRONIC CHANNEL SELECTING SYSTEM FOR A QUAD-STEREO TAPE PLAYER

[75] Inventor: Louis Clifford Maurer, Woodridge, Ill.

[73] Assignee: Motorola, Inc., Schaumburg, Ill.

[22] Filed: Dec. 31, 1974

[21] Appl. No.: 537,743

[52] U.S. Cl. .............................................. 360/63
[51] Int. Cl.[2] ...................................... G11B 15/12
[58] Field of Search ................... 360/60, 61, 62, 63

[56] References Cited

UNITED STATES PATENTS

| | | | |
|---|---|---|---|
| 3,103,650 | 9/1963 | Gehring, Jr. et al. | 360/63 |
| 3,495,230 | 2/1970 | Best | 360/63 |
| 3,588,375 | 6/1971 | Maktin | 360/60 |
| 3,721,774 | 3/1973 | Yonemoto et al. | 360/61 |
| 3,764,754 | 10/1973 | Mizumoto | 360/61 |
| 3,769,465 | 10/1973 | Wellbrock | 360/63 |

Primary Examiner—James W. Moffitt
Attorney, Agent, or Firm—James W. Gillman; Donald J. Lisa

[57] ABSTRACT

A two-four channel tape player having a single eight-track tape head or a pair of fixed position tape heads, each head having four pickups, and each pickup aligned with a track on the tape. The pickups connect to voltage controlled amplifiers which are controlled by logic circuitry. The logic circuitry is programmed to select either two channel or four channel program material and is further programmed to sequence to other tape programs in response to a sequence command. Further signal processing is accomplished in output matrixing circuitry which is also logic circuitry controlled.

18 Claims, 7 Drawing Figures

ELECTRONIC CHANNEL SELECTING SYSTEM FOR A QUAD-STEREO TAPE PLAYER

BACKGROUND OF THE INVENTION

This invention relates to circuitry for use in a cartridge type tape player for operating the player in a two or four channel mode.

Standard cartridge tape players comprise eight tracks recorded thereon. A cartridge of four channel program material contains two programs each having four recorded tracks whereas a two channel cartridge contains four programs, each program having two recorded tracks. Indexing means have been developed adapting the player to either two channel or four channel cartridges as well as accomplishing variable program selection. Conventional systems achieve indexing by mechanically moving the tape head with respect to the magnetic tape. Typically, a solenoid plunger rotates a cam which in turn relocates the tape head. As proper player operation requires exacting alignment of the tape head pickups with the recorded tracks on the tape, the mechanical system must maintain close tolerances.

The mechanical indexing system requires several costly mechanical parts, it requires close tolerances, and it is subject to wear degradation.

Due to recent technological advances in electronic circuit integration, it is becoming increasingly more feasible to replace mechanical switches with fully electronic switches. The electronic switches are more reliable and consume less space. Moreover, where a multiplicity of switches are required, the cost per electronic switch can be considerably reduced as a result of fabricating several switches in a single integrated circuit.

SUMMARY

It is an object of the present invention to provide a new and improved tape playing device for playing both two channel and four channel tape cartridges which includes a minimum of mechanical parts.

It is also an object of the present invention to provide a tape player as described above using electronic switching.

It is a further object of the present invention to provide a tape player device as described above which is inexpensive to manufacture while maintaining exacting tolerances.

Briefly, a preferred embodiment of the two/four channel playing device according to the invention employs a single eight-pickup tape head or two four-pickup tape heads oriented in fixed position to the tape, each pickup aligned with a separate track on the tape. The output signal from each pickup is coupled to a corresponding voltage controlled amplifier. If a controlled terminal of the amplifier assumes a first state the signal is coupled to output circuitry, whereas, if the terminal assumes a second state the signal will be decoupled, thereby prevented from appearing at the output. The state of the controlled amplifier is determined by logic circuitry, which is programmed to activate to a first state only those controlled amplifiers whose inputs correspond to logic command signals. A first command signal is produced from disclosed means which calls for either two or four channel program reproduction. A second command signal is produced from disclosed means which calls for program sequencing. Those signals which do reach the output are further processed in matrixing circuitry which is similarly logic controlled.

DETAIL DESCRIPTION OF THE PREFERRED EMBODIMENTS OF THE INVENTION

Figure 1A:
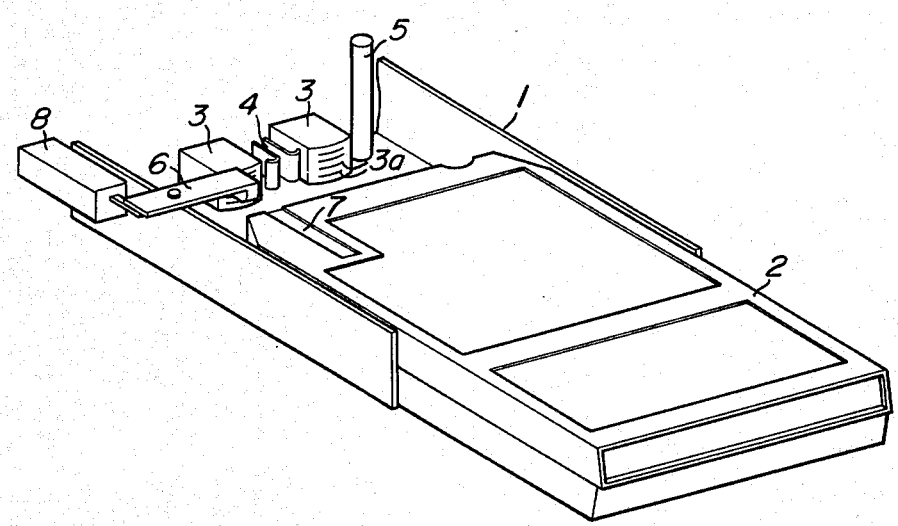
FIG. 1a is a perspective view of a portion of a cartridge tape player including two fixed position tape heads, each head having four pickup areas.

FIG. 1a is a perspective drawing of a two/four channel tape player 1 receiving a cartridge 2. The player 1 includes a pair of predeterminedly fixed position tape heads 3 mounted to the player support frame, each head having thereon four pickup areas 3a. The fixed postion of the heads 3 aligns one of the pickups 3a with a selected track on the magnetic tape contained in the received cartridge 2.

Located between the heads 3 is a conductive area sensing switch 4 which is positioned to align each of its two contacts in electrical configuration with a conducting area on the tape.

A capstan shaft 5 drives the tape through the cartridge 2 when the cartridge 2 is inserted in the tape player 1. A rocker lever 6 is in mechanical configuration with one of the two contacts of the two-four channel sensors switch 8 such that when a four channel cartridge having a provided groove 7 is received in the player 1 one end of rocker arm 6 engages the groove, the opposite end thereby causing the sensor switch 8 contacts to close. A two channel tape is provided without the groove 7 such that insertion of a two channel cartridge in the player results in the rocker arm 6 maintaining the sensor switch 8 contacts in open circuit configuration.

Figure 1B:
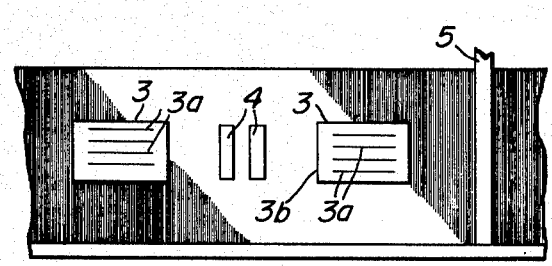
FIG. 1b is a front view of the tape head assembly further detailing the two fixed position tape heads.

FIG. 1b is a front view of the tape head assembly showing the heads 3 in predetermined fixed position for aligning each of the pickup areas 3a with a selected track on the tape. Also shown is the capstan 5 which drives the tape through the cartridge; and the sensing switch 4 which is positioned to align each of its two contacts in electrical configuration with a conducting area on the tape.

Figure 2:
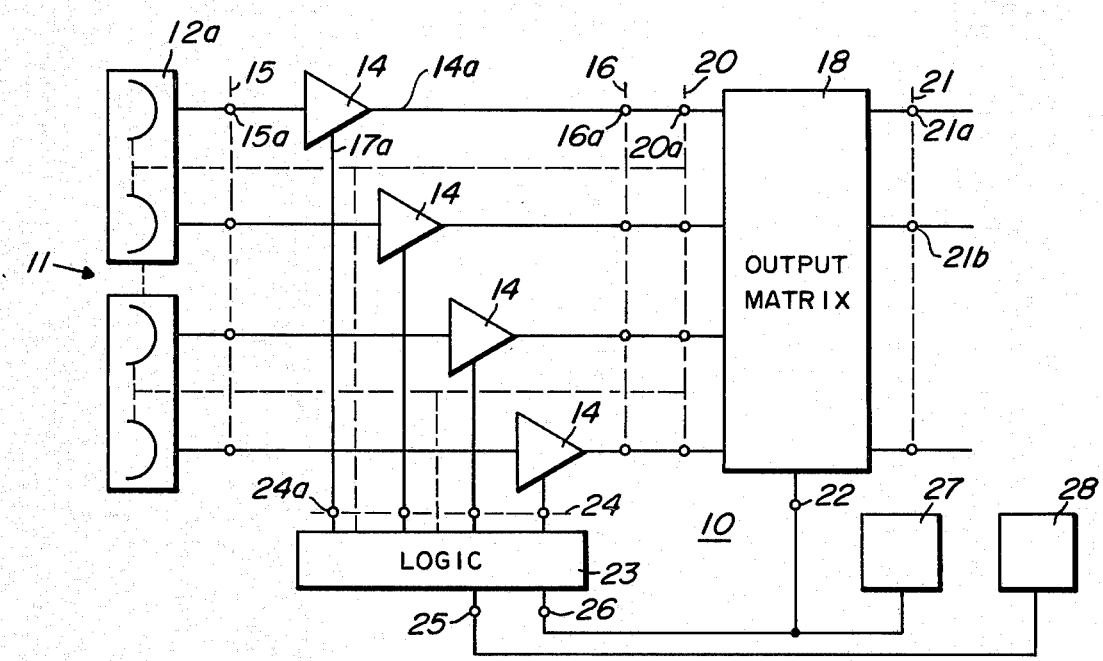
FIG. 2 is a block diagram layout of a generalized electronic selecting system in accordance with the present invention.

FIG. 2 illustrates a generalized electronic channel selecting system 10 having a multiplicity of tape heads 11; the heads having a multiplicity of pickups 12; a multiplicity of voltage controlled amplifier means 14; output matrixing means 18; logic circuitry means 23; a first sense and command means 27; and a second sense and command means 28. It is to be understood that while the generalized system employs a multiplicity of heads, a single head system is also included.

Further description involves one of the signal paths. It is to be assumed that a single component in a defined group is designed by the general number of the group followed by the subscript "a." It is understood that similar connections would be made between the remaining parallel components.

Each pickup 12a is coupled to the input terminal 15a of one of the voltage controlled amplifiers 14a. The signal at the input 15a of the voltage controlled amplifier 14a is coupled to the amplifier output terminal 16a corresponding to the amplifier's controlled terminal 17a assuming a first state; the input 15a is decoupled from the output 16a corresponding to the control terminal 17a assuming a second state. If the control terminal 17a assumes a first state the signal passes from the voltage controlled amplifier output terminal 16a to the input terminal 20a of the output matrixing means 18. The signal input 20a is either directed to a single output 21b as in the first state, or the signal input 20a is combined to paired outputs 21a and 21b as in the second state determined by the gate terminal 22 of the matrixing means 18.

A shaping amplifier (not shown) could be inserted in series between the output terminal 16a of the voltage controlled amplifier 14 and the input terminal 20a of the matrixing means 18. The shaping amplifiers would alter the signal in a predetermined frequency dependent manner, as for NAB equalization.

A control output terminal 24 of the logic means 23 connects to each one of the controlled terminals 17a of the voltage controlled amplifiers 14a.

The first sense and command means 27 senses the number of channels per program on the tape cartridge received by the player. A command signal is produced at its output corresponding to the number of channels sensed. This command signal is couped to both the first responding means input 26 of the logic circuitry 23 and the gate terminal 22 of the output matrixing means 18.

The second sense and command means 28 is comprised of a manually activated switch (not shown) and an automatic sensor switch (not shown). Activation of either switch causes a sequence command signal to be produced at the second sense and command means output, where it is coupled to the second responding means input terminal 25.

In response to the command signals of the first and second sense and command means the logic circuitry means 23 develops a first state at selected control outputs 24. This first state is coupled to the controlled inputs 17 of the voltage controlled amplifiers 14 and, as described above, determines which signals pass to the output means 18. Thus, electronic channel selecting is accomplished.

Figure 3:
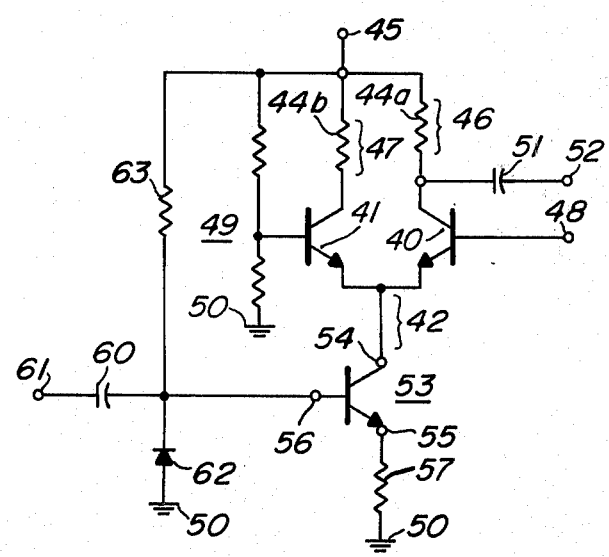
FIG. 3 is a detailed schematic of a preferred embodiment of the voltage controlled amplifier of the present invention.

FIG. 3 illustrates a preferred embodiment of the voltage controlled amplifier. A first NPN transistor 40 and a second NPN transistor 41 form a differential amplifier. The emitters of the two transistors 40, 41 are interconnected thereby forming a current source branch 42. The collector of the first transistor 40 is coupled through a load resistor 44a to the DC supply 45 forming a first current branch 46. The collector of the second transistor is coupled through a resistor 44b to the DC supply 45 forming a second current branch 47. The base of the first transistor 40 connects to the controlled terminal 48 (corresponding to controlled terminals 17a of FIG. 2), whereas the base of the second transistor 41 is fixed biased off of the tap of a voltage divider 49 which extends from the DC supply 45 to ground 50. A first capacitor 51 couples the collector of the first transistor 40 to the output terminal 52 (corresponding to output terminal 16a of FIG. 2).

A third NPN transistor 53 comprises a voltage controlled current source. The collector lead of the third transistor constitutes a first terminal 54, its emitter lead constitutes a second terminal 55, and its base lead consitutes a voltage control terminal 56. The first terminal 54 connects to the current source branch 42, the second terminal 55 connects through a bias resistor 57 to ground 50, and the voltage control terminal 56 is coupled through a second capacitor 60 to the input terminal 61 (corresponding to input terminal 15a of FIG. 2). Also connected to the control terminal 56 is the cathode of a diode 62 the anode of which connects to ground 50. In normal circuit operation the diode is biased in the avalanche mode via current supplied through a resistor 63 from the DC supply means 45 to the diode's cathode. The voltage developed across the diode 62 biases the third NPN transistor 53.

A time varying voltage signal from the tape head pickup, i.e. the pre-recorded signal, is coupled to the voltage control terminal 56 through input terminal 61 and capacitor 60 causing a proportional time varying current to flow in the collector of the voltage controlled transistor 53, and therefore in the current source branch 42. If the voltage applied to the control terminal 48 is substantially lower than the reference voltage applied to the base of the second transistor 41, then substantially all of the current source branch 42 current will flow in the second current branch 47. In this manner the output terminal 52 is electronically decoupled from the input terminal 61.

If the voltage applied to the control terminal 48 is substantially greater than the reference voltage applied to the base of the second transistor 41, substantially all of the current source branch 42 current will flow in the first current branch 46. In this mode, a time varying voltage is developed at the collector of the first NPN transistor 40 which is proportional to the time varying first branch 46 current due to the action of the load resistor 44. This time varying voltage is coupled to the output terminal 52 via the first capacitor 51. In this manner the output terminal 52 is effectively coupled to the input terminal 61.

Figure 4:
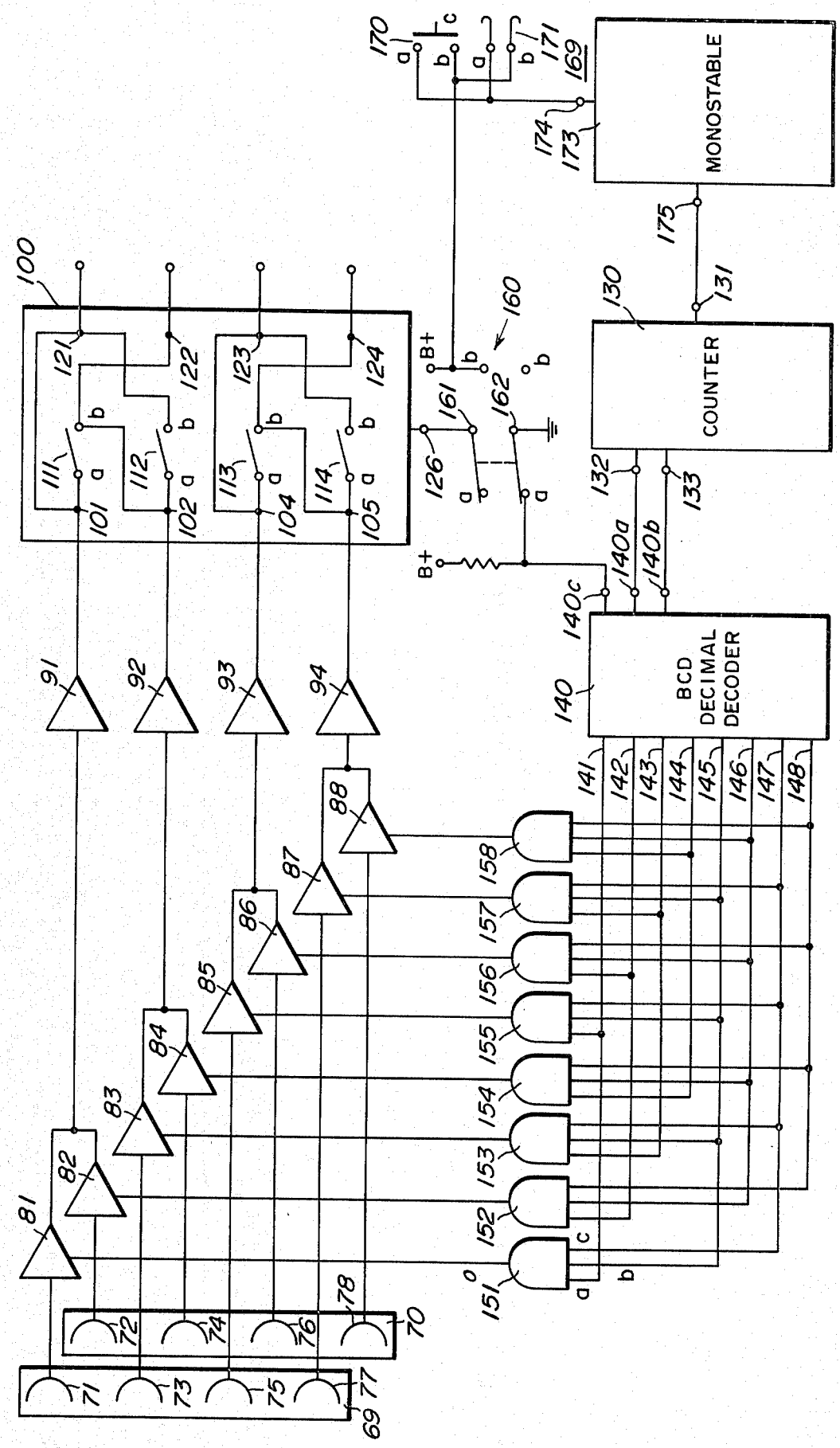
FIG. 4 is a schematic diagram of a two channel/four channel electronic selecting system of the present invention.

FIG. 4 is a schematic diagram of a two channel/four channel electronic selecting system. A first tape head 69 has four pickup areas 71, 73, 75 and 77, a second tape head 70 also has four pickup areas 72, 74, 76 and 78. The heads are fixedly mounted to a support (not shown) and are oriented to align each pickup area with one of the tracks on the received tape. Alternatively, a single, fixed position head having eight pickups could be used. All connections to the two four-track heads would apply in a similar manner to the single eight-track head. Each pickup area 71-78 is coupled to the input of a corresponding voltage controlled amplifier 81-88. The amplifiers 81-88 may be of the same design discussed with reference to FIG. 3. As previously discussed, each controlled amplifier 81-88 has a controlled terminal wherein a first assumed state results in the input of the amplifier being coupled to the output of the amplifier. A second assumed state at the controlled terminal results in the input being decoupled from the output.

The outputs from the first 81 and second 82 controlled amplifiers connect to the input of the first 91 of four shaping amplifiers 91-94; the ouputs from the third 83 and fourth 84 amplifiers connect to the input of a second shaping amplifier 92; the outputs from the fifth 85 and sixth 86 amplifiers connect to the input of the third shaping amplifier 93; and the outputs from the seventh 87 and eighth 88 amplifiers connect to the input of the fourth shaping amplifier 94.

The shaping amplifiers 91-94 have frequency dependent transfer characteristics providing NAB equalization. The output of each shaping amplifier 91-94 connects to a corresponding input terminal 101-104 of the output matrixing means 100.

The output matrixing means is comprised of: four switches 111-114, each switch having a first contact 111a-114a a second contact 111b-114b and a gate contact (not shown); four input terminals 101-104; four output terminals 121-124; and a gate terminal 126.

The first input terminal 101 connects to the first contact 111a of the first switch 111, to the second contact 112b of the second switch 112; and to the first output terminal 121. The second input terminal 102 connects to the first contact 112a of the second switch 112, to the second contact 111b of the first switch 111, and to the second output terminal 122. The third input terminal, 104 connects to the first contact 113a of the third switch 113, to the second contact 114b of the fourth switch, and to the third output terminal 123. The fourth input terminal 105 connects to the first contact 114a of the fourth switch 114, to the second contact 113b of the third switch 113, and to the fourth output terminal 124.

The gate contacts of every switch 111-114 are interconnected and connected to the gate terminal 126. When the voltage at the gate terminal 126 is at or exceeds a predetermined threshold level each first contact 111a-114a is connected to each second contact 111b-114b respectively. For the gate terminal 126 voltages less than the threshold voltage the contacts 111a-114a, 111b-114b are isolated.

The logic circuitry is comprised of a counter 130, a BCD/Decimal decoder 140, and eight OR gates 151-158.

The counter 130 has an input terminal 131, a first output terminal 132, and a second output terminal 133. The counter responds to pulses at the input terminal 131 with a binary coded decimal count at the outputs 132, 133, The first output 132 corresponds to two to the zero power whereas the second output 133 represents two to the first power.

The BCD/Decimal decoder 140 has three inputs 140a, 140b, 140c and eight outputs 141-148. The inputs 140a,b,c; accept binary coded decimal, the first input 140a corresponding to two to the zero power, the second input 140b corresponding to two to the first power, and the third input 140c corresponding to two to the second power. The outputs 141-148 assume the decimal equivalent of the input. For example, with the inputs 140a,b,c; all at zero only the first output 141 will be high. As the count increases at the inputs 140a,b,c; a sequential decoder output will go high.

Each of the eight OR gates has three inputs (represented by subscripts a,b, and c) and one output (represented by subscript 0). The output of an OR gate goes high if any input is high.

Interconnections internal to the logic circuitry are as follows. The first counter output 132 connects to the first decoder input 140a; the second counter output 133 connects to the second decoder input 140b. The first decoder output 141 connects to the first input 151a of the first gate and the first input 155a of the fifth gate 155; the decoder's second output 142 connects to the first input 152a of the second gate 152 and the first input 156a of the sixth gate; the third decoder output 143 connects to the first input 153a of the third gate 153 and the first input 157a of the seventh gate 157; the fourth decoder output 144 connects to the first output 154a of the fourth gate 154 and the first input 158a of the eigth gate 158; the fifth decoder output 145 connects to the second input 151b of the first gate, the second input 153b of the third gate 143, the second input 155b of the fifth gate 155, and the second input 157b of the seventh gate 157. The sixth decoder ouput 146 connects to the second input 152b of the second gate 152, the second input 154b of the fourth gate 154, the second input 156b of of the sixth gate 156, and the second input 158b of the eighth gate 158; the seventh decoder output 147 connects to the third input 151c of the first gate 151, the third input 153c of the third gate 153, the third input 155c of the fifth gate 155, and the third input 157c of the seventh gate 157; the eighth decoder output 148 connects to the third input 152c of the second gate 152, the third input 154c of the fourth gate 154, the third input 156c of the sixth gate 156, and the third input 158c of the eighth gate 158.

The output of each gate 151o-158o connects to a corresponding one of the controlled terminals of the voltage controlled amplifiers 81-88.

A first sense and command means 160 is comprised of a switch having two mechanically ganged but electrically isolated movable center connectors 161, 162. Each movable center connector 161, 162 makes contact to either a first pole 161a, 162a or a second pole 161b, 162b, each pole being electrically isolated from all other poles. The first center connector 161 and its associated first pole 161a and second pole 161b comprise the first half of the switch whereas the second center connector 162 and its associated first pole 162a and second pole 162b comprise the second half of the switch.

Connections are as follows. The first center connector 161 connects to the gate terminal 126 of the output matrixing means 100. The first pole 161a of the first half of the switch is unconnected. The second pole 161b of the first half of the switch connects to the DC supply means. The second center connector 162 connects to ground, the first pole 162a of the second half of the switch connects both through a resistor to the DC supply end to the third input 140c of the decoder 140; and the second pole 162b of the second half of the switch is unconnected.

The state of the first sense switch is representative of whether the received cartridge is a two channel or a four channel type. The switch is operated automatically on cartridge insertion. The ganged center connectors 161, 162 connected to their first poles 161a, 162a corresponds to a two channel cartridge being received by the player. The first connector 161 will couple the unconnected first pole 161a to the output matrix gate terminal 126 causing all matrix switches 111-114 to close. The second center connector 162 couples the first pole 162a to ground thereby causing the third input of the decoder 140c to go low. When a four channel cartridge is inserted the first center connector 161 connects the DC supply means to the gate terminal 126 thereby causing the switches 111–114 to open, and the second center connector 162 decouples from the third input of the decoder 140c allowing it to go high.

A second sense and command means 169 is comprised of a manually activated pushbutton switch 170, a pair of contact sensors 171, and a monostable multivibrator 173.

The manual switch 170 has two stationary contacts 170a,b, and one spring loaded movable contact 170c. The movable contact 170c connects the first contact 170a to the second contact 170b when the switch 170 is depressed. The two contacts 170a,b are otherwise electrically isolated.

The two contact sensors 171a,b are positioned in spaced relation and physical configuration aligning the contacts 171a,b to make contact to a conducting area on the tape thereby connecting the first contact 171a to the second contact 171b.

The monostable multivibrator 173 has an input terminal 174, an output terminal 175, and internal circuitry (not shown) known to those skilled in the art and not part of this invention. The circuitry of the monostable causes a pulse of predetermined duration to appear at the output terminal 175 each time a signal is received at the input terminal 174.

Interconnections are as follows. The first switch contact 170a connects to the first contact sensor 171a and is coupled to the input terminal 174 of the multivibrator 173; the second switch contact 170b connects to the second sensor contact 171b and also connects to the DC supply means; the monostable multivibrator output terminal 175 connects to the counter's input 131.

Upon either manual depression of the switch 170 or the tape conducting area contacting the contact sensors 171 the monostable multivibrator is triggered causing it to produce a defined pulse at its output terminal which thereby sequences the counter.

Figure 5:
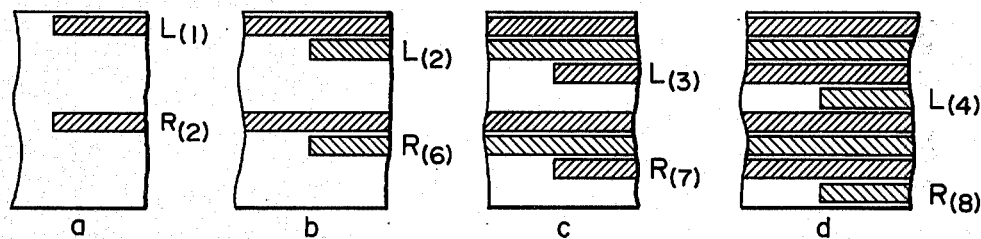
FIG. 5 illustrates channel location on a two channel tape.

Referring to FIG. 5, every two channel cartridge is comprised of four programs, each program having two tape tracks. The first program 5a has the left channel on the first track and the right channel on the fifth track. The second program 5b has the left channel on the second track and the right channel on the sixth track. The third program 5c has the left channel on the third track and the right channel on the seventh track. Finally, the fourth program 5d has the left channel on the fourth track and the right channel on the eighth track.

Figure 6:
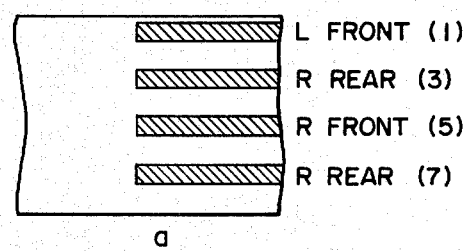
FIG. 6 illustrates channel location on a four channel tape.
Figure 6:
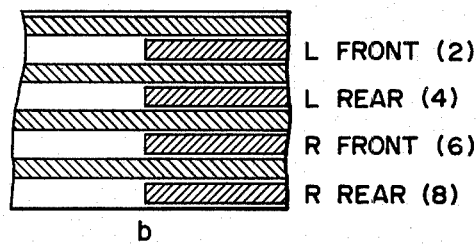

Referring to FIG. 6 every four channel cartridge is comprised of two programs, each program having four tape tracks. The first program 6a has left front on the first track, left rear on the third track, right front on the fifth track and right rear on the seventh track. The second program 6b has left front on the second track, left rear on the fourth track, right front on the sixth track and right rear on the eighth track.

Referring also to FIG. 5, the first tape head 69 is positioned to align its first pickup area 71 with the first tape track, its second pickup area 73 with the third tape track, its third pickup area 75 with the fifth tape track, and its fourth pickup area 77 with the seventh tape track.

The second tape head 70 is positioned to align its first pickup 72 with the second tape track, its second pickup 74 with the fourth tape track, its third pickup area 76 with the sixth tape track, and its fourth pickup area 78 with the eighth tape track.

Should a single eight track head be used, each pickup would be positioned to be aligned with a corresponding track on the tape.

System operation is best understood with reference to FIG. 4. When a two channel tape cartridge is received in the player the first sensing means causes all of the switches 111–114 in the output matrix 100 to close, and it causes the third input 140c of the decoder 140 to assume a low state. With only the first decoder input 140a or the second decoder input 140b able to go high the only possible decoder outputs 141–148 that can go high are the first thru fourth 141–144 outputs. Assuming the first decoder output 141 is high the first gate 151 and the fifth gate 155 become activated causing their outputs 151o, 155o to go high thereby causing the controlled terminal of the first 81 and fifth 85 voltage controlled amplifiers to assume a high state. The signals from the first 71 and fifth 75 pickups are coupled thru the first 91 and third 93 shaping amplifiers to the first 101 111–114 third 103 output matrix input terminals. As the switches 111–in the output matrix 100 are all closed, the signal from the first pickup 71 appears at the first 121 and second 122 matrix output terminals; the signal from the fifth pickup 75 appears at the matrix third 123 and fourth 124 output terminals. Thus the first program of the tape appears, ready to be transduced, at the matrix output terminals.

If either of the second sensor switches 170, 171 is activated the monostable multivibrator produces an output pulse which steps the counter 130 output to the next higher state thereby stepping the decoder 140 to its next output. If the previous selection had been the first program, the two counter outputs 140a and 140b would have both been low causing the decoder's first output 141 to be high. The sequencing pulse from the monostable multivibrator 173 will cause the first counter output 140a to go high thereby causing the second decoder output 142 to go high. This causes the second gate 152 and the sixth gate 156 to become activated, and by previous analysis, the left channel of the second program will appear at the first 121 and second 122 matrix outputs, the right channel appearing at the third 123 and fourth 124 matrix outputs.

Upon receiving a four channel tape cartridge in the player, the first sense means causes all of the matrix switches 111–114 to open, and it causes the third input 140c to the decoder 140 to assume a high state. With its third input 140c high the decoder 140 can produce outputs only at its fifth through eighth terminals 145–148. Assuming the fifth output terminal 145 is high, the first 151, third 153, fifth 155, and seventh 157 gates are activated. By previous analysis the input signals from the first 71, third 73, fifth 75, and seventh 77 pickups appear at the first through fourth 101–104 input matrix terminals respectively. As the matrix switches 111–114 are all open, the signals pass straight through to the matrix output terminals 121–124 whereat the first output terminal 121 assumes the left front track, the second output terminal 122 assumes the left rear track, the third output terminal 18 assumes the right front track and the fourth output terminal 124 assumes the right rear track. Upon a sequence command from either the push-button switch 170 or the contact sensors 171 the monostable multivibrator 173 produces a pulse which increases the counter's 130 output by one, thereby causing the decoder's 140 sixth output 146 to go high. Now the even numbered pickup areas 72, 74, 76, 78 signals are coupled through to the matrix output terminals corresponding to the second program on the four channel tape.

The nature of the system leads itself to being realized by integrated circuits. Specifically:

The voltage controlled amplifiers can be constructed using four Motorola MC3354P IC's; the shaping amplifier can be constructed using a National LM3900 IC; the output matrix can be constructed using an Intersil 1H5012 IC; the counter can be constructed using a Motorola MC4023 IC; the decoder can be constructed using a Motorola MC5442 IC; the eight OR gates can be constructed using three Motorola MC5410 IC's; and the monostable multivibrator can be constructed using a Motorola MC54121 IC.

Clearly, the circuitry could be further integrated as, for example, incorporating all circuitry into a single integrated circuit.

While a preferred embodiment has been described there could be a multitude of variations are possible all of which would come within the full spirit and scope of the invention.

I claim:

1. A magnetic tape playing device for playing a selected one of two or more analog programs on a prerecorded multitrack tape, each program comprised of two or more predeterminedly located tracks on the tape comprising
    support means,
    a magnetic tape head means having a plurality of pickup areas and being fixedly mounted to the support means for generating output signals representative of information prerecorded on the magnetic tape moved past a pickup area,
    means for creating a relative motion between a multitrack prerecorded magnetic tape and the magnetic tape head means for sensing the prerecording on the tape,
    the support means permanently aligning each pickup area with a separate track on the tape,
    a plurality of output terminals,
    a plurality of fully electronic switches, each electronic switch capable of being activated for coupling a predetermied one of the pickups to a predetermined output terminal,
    program selecting means for selecting the program to be played, and
    control means for automatically determining the number of tracks which comprise a program on the particular tape being played and responding to the program selecting means to activate only those electronic switches which couple a desred pickup to a desired output.

2. The mangetic tape playing device as claimed in claim 1 wherein the magnetic tape head means is comprised of a single head having eight pickup areas.

3. The magnetic tape playing device as claimed in claim 1 wherein the magnetic tape head means is comprised of a pair of tape heads, each head having four pickup areas.

4. The magnetic tape playing device as claimed in claim 1 wherein the means for creating relative motion includes means for receiving a tape cartridge housing the tape and means for driving the tape past the tape head means.

5. The magnetic tape playing device as claimed in claim 1 wherein the plurality of fully electronic switches comprise:
    a plurality of voltage controlled amplifiers each operable between a first state and a second state,
    the output signal from each pickup being coupled to a corresponding one of the voltage controlled amplifiers,
    output circuit means for selectively matrixing the signals from the amplifiers in a predetermined channel number mode corresponding to the number of tracks comprising a program on the particular tape being played,
    the output signal from each amplifier being coupled to the output circuit means when the corresponding controlled amplifier is in the first state and being blocked from passing to the output circuit means when the corresponding controlled amplifier is in the second state; and wherein the control means comprises
    logic circuit means for controlling the operation of each controlled amplifier between the first and second state; and
    command circuit means for generating a first command signal selecting the predetermined channel number mode and a second command signal sequencing the logic circuit means,
    the logic circuit means activating to a first state only those amplifiers whose inputs correspond to the signals from the command circuit means, and
    the output circuit means selecting the predetermined channel number mode in response to one of the command signals,
    whereby the output of the output circuit means is available for transducing to audibility the exact prerecorded information commanded by the command signals.

6. The magnetic tape playing device in claim 5 wherein the first command signal activates the output circuit means to select the predetermined channel number mode.

7. The magnetic tape playing device as claimed in claim 5 adapted to receive and play two channel and four channel tape cartridges
    wherein the means for creating relative motion includes means for receiving a tape cartridge housing, an 8-track pre-recorded tape and means for driving the tape past the tape head means,
    further comprising
    two tape heads, each head having four pickup areas,
    eight voltage controlled amplifier means,
    the output circuit matrixing means including
        four input terminals,
        four output terminals, and
        four electronic switches, and
    the logic circuitry means including
        eight control output terminals.

8. The magnetic tape playing device as claimed in claim 5 adapted to receive and play two channel and four channel tape cartridges
    wherein the means for creating relative motion includes means for receiving a tape cartridge housing, an 8-track pre-recorded tape and means for driving the tape past the tape head means,
    further comprising
    one tape head having eight pickup areas,
    eight voltage controlled amplifier means, the output circuit matrixing means including
four input terminals,
four output terminals, and
four electronic switches, and
the logic circuitry means including
eight control output terminals.

9. The magnetic tape playing device as claimed in claim 5 further comprising
a multiplicity of shaping amplifier means, each shaping means having,
an input,
an output, and
internal circuitry,
the internal circuitry coupling the input to the output in a predetermined frequently dependent manner
wherein each shaping amplifier series couples one output of the voltage controlled amplifiers to one input of the output matrixing means, the input of each shaping amplifier connected to the respective output of at least one voltage controlled amplifier, the output of each shaping amplifier connected to one of the output matrixing means input terminals,
whereby the signals at the output terminals of the voltage controlled amplifiers are predeterminedly shaped prior to output matrixing.

10. The magnetic tape playing device as claimed in claim 5 wherein
each voltage controlled amplifier means comprises
a differetial amplifier means having
a first current branch having a first gate and an output terminal,
a second current branch having a second gate, and
a current source branch having a voltage controlled current source having an input terminal and being cooupled to the first and second branches and providing in response to a time varying signal applied to the input terminal of the voltage controlled current source, a proportional time,
varying current through the current source branch, the current source branch current flowing substantially in the second current branch corresponding to the second gate terminal voltage exceeding the first gate terminal voltage and current flowing substantially in the first branch corresponding to the first gate terminal voltage exceeeding the second gate voltage to thereby provide an output signal at the output terminal representative of the time varying input signal.

11. The magnetic tape playing device as claimed in claim 10 wherein
the output terminal of the first current branch is the controlled amplifier output terminal,
the input terminal of the voltage controlled current source is the controlled amplifier input terminal, and
the first gate is coupled to the controlled terminal of the amplifier
whereby signals applied to the first gate by the logic circuit means controls the voltage level at the first gate relative to a reference voltage potential applied to the second gate.

12. The magnetic tape playing device as claimed in claim 5 including
the output circuit means comprising matrixing means having four electronic switches, each switch having
a first contact,
a second contact,
a gate contact,
an input terminal, and
an output terminal
the impedance between the first contact and second contact being low corresponding to the voltage at the gate contact at or exceeding a threshold voltage, the impedance therebetween otherwise being high,
the first input terminal connected to the first contact of the first switch, the second contact of the second switch, and the first output terminal, the second input terminal connected to the first contact of the second switch, the second contact of the first switch and the second output terminal, the third input terminal connected to the first contact of the third switch, the second contact of the fourth switch, and the third output terminal, the fourth input terminal connected to the first contact of the fourth switch, the second contact of the third switch, and the fourth output terminal,
the gate contacts of all switches directly interconnected and being coupled to the first command signal of the command circuit means.

13. The magnetic tape playing device as claimed in claim 5 wherein
the logic circuit means comprises
a counter having
an input terminal,
a first output, and
a second output,
the outputs representative of the binary coded decimal count of the input, the first output corresponding to two to the zero power, the second output corresponding to two to the first power,
a binary coded decimal decoder having
three inputs, and
eight outputs,
the inputs accepting binary coded decimal, the first input corresponding to two to the zero power, the second input corresponding to the first power, the third input corresponding to two to the second power,
the outputs being the decimal equivalents of the inputs, the first output high representing zero, in sequence to the eighth output high representing seven, and
eight OR gates,
each gate having three inputs and one output the output high corresponding to at least one input high,
the counter input terminal connecting to the command circuit means which generates the second command signal
the first counter output connects to the first decoder input, the second counter output connects to the second decoder input, the command circuit means which generates the first command signal connects to the third decoder input, the first decoder output connects to the first input of the first gate and the first input of the fifth gate, the second decoder output connects to the first input of the second gate and the first input of the sixth gate, the third decoder output connects to the first input of the third gate and the first input of the seventh gate, the fourth decoder output connects to the first input of the fourth gate and the first input of the eighth gate, the fifth decoder output connects to the second input of the first gate, the second input of the third gate, the second input of the fifth gate, and the second input of the seventh gate, the sixth decoder output connects to the second input of the second gate, the second input of the fourth gate, the second input of the sixth gate, and the second input of the eighth gate, the seventh decoder output connects to the third input of the first gate, the third input of the third gate, the third input of the fifth gate, and the third input of the seventh gate, the eight decoder output connects to the third input of the second gate, the third input of the fourth gate, the third input of the sixth gate, and the third input of the eighth gate, each gate output is coupled to a corresponding voltage controlled amplifier.

14. The magnetic tape playing device of claim 5 wherein the command circuit comprises
first sense and command means having a switch,
the switch having two mechanically ganged but electronically isolated movable center connectors,
each movable center connector making contact to either a first pole or a second pole dependent on switch position, each pole electrically isolated from all other poles,
the first center connector and its associated first and second poles comprising the first half of the switch,
the second center connector and its associated first and second poles comprising the second half of the switch,
the center connector of the first half of the switch connecting to the gate terminal of the output matrixing means, the first pole of the first half of the switch being left unconnected, the second pole of the first half of the switch connecting to the DC supply means, the center connector of the second half of the switch connecting to the reference potential, the first pole of the second half of the switch connecting through the resistor to the DC supply means and to the first responding means of the logic circuitry means, the second pole of the second half of the switch being left unconnected.

15. The magnetic tape playing device as claimed in claim 14 wherein the center connector of the second half of the switch connects to the third input of the counter.

16. The magnetic tape playing device as claimed in claim 14 wherein the first sense and command means is responsive to two channel or four channel tape cartridges.

17. The magnetic tape playing device as claimed in claim 5 wherein the command circuit means comprises
a second sense and command means having a momentary pushbutton switch,
the switch having two stationary contacts and one spring loaded movable contact, the movable contact connecting the first contact to the second contact on manual depression, the contacts otherwise isolated,
a pair of contact sensors,
the contacts in spaced relation and physical configuration aligning with a conductive area on the tape causing the contacts to be connected, the contacts otherwise isolated, and
a monostable multivibrator having
an input terminal,
an output terminal,
and internal circuitry,
the circuitry coupling the input to the output,
a trigger signal at the input terminal activating the circuitry, the output terminal thereby assuming a single pulse voltage of duration predetermined dependent on the circuitry,
wherein
the first switch contact connects to the first contact sensor and is coupled to the input terminal of the monostable multivibrator, the second switch contact connects to the second contact sensor and also connects to the DC supply means, the monostable output connects to the second sense means output,
whereby manual activation of the switch or tape conducting area contacting the contact sensors triggers the monostable input thereby causing a defined pulse to appear at the terminal output.

18. A cartridge type tape player adapted to receive and play multi-channel tape cartridges comprising in combination:
a tape head means having a multiplicity of pickup areas,
a multiplicity of voltage controlled amplifier means including an input terminal, an output terminal, and a controlled terminal,
the input terminal coupled to the output terminal corresponding to the controlled terminal assuming a first state,
the input terminal decoupled from the output terminal corresponding to the controlled terminal assuming a second state,
an output matrixing means including
a multiplicity of input terminals,
a multiplicity of output terminals,
a gate terminal,
a multiplicity of electronic switches having a first pole, a second pole, and a gate pole, a low impedance between the first and second poles corresponding to the gate pole assuming a command signal state, the impedance otherwise high therebetween,
interconnecting means coupling in parallel all gate poles, connecting the poles to the gate terminal, connecting the matrix input terminals, the matrix output terminals, the first poles, and the second poles in a predetermined configuration,
a logic circuitry means including a multiplicity of control output terminals, the terminals developing a first state or a second state,
a first responding means input terminal coupled to a first responding means producing predetermined control terminal states dependent on received channel number command signals,
a second responding means input terminal coupled to a second responding means producing predetermined control terminal output states dependent on received program sequence command signals
a first sense and command means producing a channel number command signal at its output corresponding to the number of channels per program sensed on the tape received by the player,
a second sense and command means including a manually activated switch, an automatic sensor switch, producing a program sequence command at its output corresponding to activation of one of the switches wherein the improvement comprises the head means of predeterminedly fixed position aligning the pickup areas with selected tracks on the tape, each pickup area coupled to one of the input terminals of the amplifier means, the output terminal of each of the amplifier means coupled to one of the input terminals of the matrixing means, each of the controlled terminals of the amplifier means connected to one of the control output terminals of the logic means, the first responding means input terminal connected to the output of the first sense and command means, the second responding means input terminal connected to the output of the second sense and command means, the gate terminal of the matrixing means connected to the first sense and command means, whereby in response to the number of channels per program sensed by the first sense and command means and the sequence activation commanded by the second sense and command means, the logic circuitry develops a first state at selected control outputs causing selected input signals to pass from the input terminal to the output terminal of the voltage controlled amplifiers, these selected signals then isolated or combined in the output matrixing means, the means also responding to the first sense and command means, the output of the matrixing means available for transducing to audibility the exact channels and programs as commanded by the first and second sense and command means.

* * * * *